Aug. 22, 1933.    C. F. HATHAWAY    1,923,307
FLEXIBLE COUPLING
Filed March 13, 1931
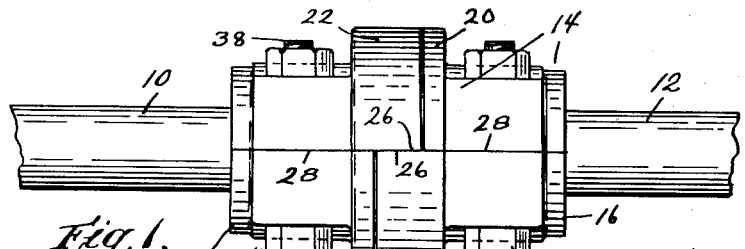
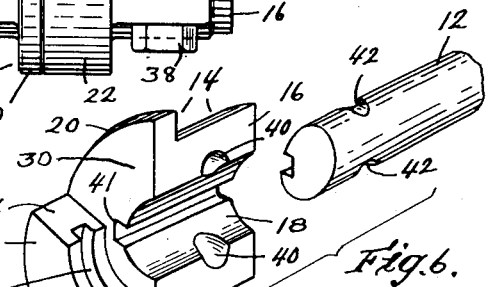
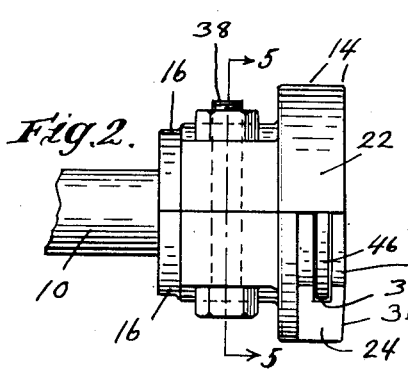
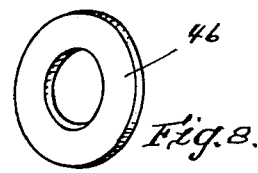
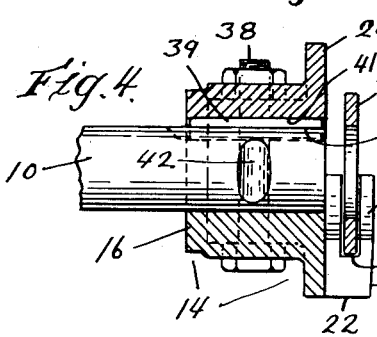
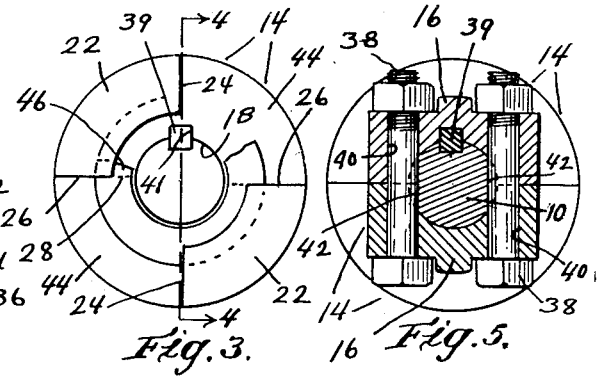
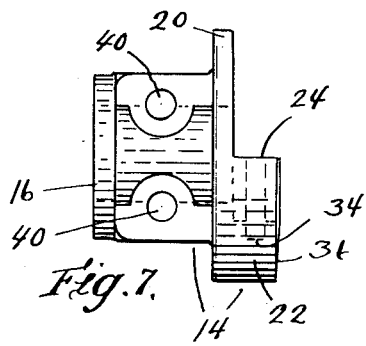
Inventor.
Chester F. Hathaway Patented Aug. 22, 1933

1,923,307

UNITED STATES PATENT OFFICE 1,923,307

FLEXIBLE COUPLING

Chester F. Hathaway, New Bedford, Mass., assignor to Hathaway Machinery Company, a copartnership composed of Chester F. Hathaway, New Bedford, Mass., and Eli G. Braley, Fairhaven, Mass.

Application March 13, 1931. Serial No. 522,435

8 Claims. (Cl. 64—89)

This invention relates to flexible couplings that are especially adapted although not necessarily restricted to marine propulsion for connecting the engine or drive shaft with a propeller shaft.

A number of difficulties are involved in the application of a flexible coupling to marine propulsion to connect the engine or drive shaft with a propeller shaft. The propeller exerts a thrust on and lengthwise of the propeller shaft. The thrust may be in either direction, depending upon whether the propeller shaft is rotating for forward or for reverse drive. The thrust in many instances must be transmitted through the flexible coupling to the engine or drive shaft where the thrust is taken by a suitable thrust bearing. By reason of the thrust the cooperating parts of the coupling must be locked together against displacement relative to each other both laterally and in a direction lengthwise of the shafts and must also be locked to the shafts against axial displacement thereon. The coupling also must be so designed that it can be applied to the confronting ends of the two shafts without requiring the shafts to be moved apart any material distance. These requirements are not found in couplings at present on the market. Consequently an object of the present invention is in the provision of a flexible coupling embodying these requirements.

A further object of the invention is the provision of a coupling that is especially adapted to transmit thrust between the coupled shafts as, for instance, between the propeller shaft of a boat and the engine or drive shaft for the propeller shaft.

Another object of the invention is the provision of a flexible coupling that can be applied to the closely confronting ends of two shafts without the necessity for widely separating the ends.

Another object of the invention is the provision of a coupling, the relatively angularly movable parts of which are locked together so that the parts of the coupling can not become accidentally separated by movement axially of the shafts.

A further object of the invention is the provision of a flexible coupling wherein the parts that are carried by the confronting ends of the two shafts are connected together against axial displacement and also wherein the two parts of the coupling are positively connected with their respective shafts against axial displacement with respect thereto so that the coupling holds the shafts in their intended position while permitting a certain amount of angular movement of one shaft with respect to the other.

Another object of the invention is generally to improve the construction and operation of flexible couplings.

Fig. 1 is a side elevation of a flexible coupling embodying the present invention.

Fig. 2 is a side elevation of one of the coupling members associated with one of the driving shafts.

Fig. 3 is an end view of the coupling member of Fig. 2.

Fig. 4 is a sectional view taken along line 4—4 of Fig. 3.

Fig. 5 is a sectional view taken along line 5—5 of Fig. 2.

Fig. 6 is a perspective view of one of the sections of a coupling member removed from its associated shaft.

Fig. 7 is a plan view of a coupling section.

Fig. 8 is a perspective view of the locking ring between the coupling members.

The flexible coupling here shown as embodying the present invention is adapted to connect the driving shaft 10, which may be an engine shaft, with the driven shaft 12, which may be a propeller shaft. The shafts 10 and 12 are adapted to be axially aligned and the coupling is intended to transmit the drive between the shafts and to permit one of the shafts as the propeller shaft 10 to be displaced angularly from the axial line of the other shaft while maintaining the driving connection therebetween. The coupling comprises two coupling members which are adapted to be secured in interlocking driving relation onto the confronting ends of the driving and driven shafts. Each coupling member comprises two coupling sections 14, the specific construction of which is illustrated in Fig. 7. Each coupling section comprises a hub 16 having a semi-cylindrical shaft receiving groove or recess 18 extended axially therein and an outstanding semi-circular flange 20 at one end of the hub. The flange 20 is formed at one side with an axially extended jaw 22 which extends through 90° of arc and terminates in the flat radially disposed opposite radial side faces 24 and 26, the end face 26 being a continuation of the flat face 28 of the hub 16 and the flange 20. The end face 30 of the flange 20 is radial. The inner end face 32 of the jaw is circularly formed and is concentric with and outstands radially beyond the shaft groove 18 in the hub. Said face 32 is provided with a circular radial groove 34 in the middle thereof.

The end face 36 of the jaw 22 is tapered slightly rearwardly from the inner face 32 in a rearward direction or toward the hub 16 as is best shown in Figs. 4 and 7, so as to permit the desired extent of angular movement of the shafts. The coupling section as above described is identical in both coupling members, four identical sections thus comprising the flexible coupling. Each coupling member comprises two of the above described coupling sections, which sections are secured together with the flat faces 28 of the hub and the flange in confronting relation and in engagement and with the two jaws 22 of the coupling sections in diametrically opposed relation as is best shown in Fig. 3. The coupling sections of a coupling member are secured together and to the shaft by bolts 38 which pass through bolt passages 40 in the hubs of the confronting sections and lie in opposed recesses 42 of the shaft whereby the coupling member is secured to the shaft both against rotation and against displacement axially of the shaft. The coupling member is also keyed onto its shaft by a key 39 which lies in a keyway 41 formed in one of the coupling sections. The complemental coupling section of the coupling member need not be keyed to the shaft as it is held from rotation by the keyed section. The coupling member constructed as thus described is provided with opposed jaws 22 and opposed spaces 44, see Fig. 3.

The two coupling members on the confronting shafts are assembled together with the jaws of one coupling member located in the spaces between the jaws of the other coupling member as illustrated in Fig. 1 and with the circular grooves 34 of the jaws lying in the same radial plane. A locking and thrust member, comprising a ring 46, is located in said aligned grooves 34 of all of the jaws and thus connects the coupling members together against axial displacement. Said ring 46 is substantially thinner than the width of the grooves 34 as is illustrated in Figs. 2 and 4 so that the coupling members can be angularly displaced while remaining locked against undue displacement axially of the shafts. The diameter of the ring is not materially less than the diameter of the aligned retaining grooves so that the coupling members are held co-axial and against displacement laterally of the axes of the shafts, although there is sufficient clearance to permit the desired degree of angular movement about the ring as a center. With this construction the coupling holds the shafts locked against axial displacement and transmits axial thrust between the shafts. The coupling can also be applied to the shaft without separating them more than the thickness of the thrust ring 46 since each coupling member is composed of two half sections. The jaws 22 of one coupling member closely fits within the spaces 44 of the other coupling member so that there is a direct engagement of the side faces of the intermeshed jaws of the two coupling members to transmit rotational forces and, while the clearance is sufficient for mechanical purposes and to permit the desired degree of flexibility, there is insufficient play to set up any material amount of back lash or lost motion in the driving connection between the shafts.

I claim:

1. The combination of aligned driving and driven shafts, a flexible coupling connecting said shafts comprising two coupling members having intermeshed engaged driving jaws, each coupling member comprising two complemental sections each having a jaw, an inter-jaw recess, and a shaft-recess, means clamping said complemental sections together and to the shaft with the jaws in spaced relation and with the coupling members held against axial displacement and rotation on the shafts, and loose means located within and having floating connections with the jaws of both coupling members which hold them against relative axial and lateral displacement while permitting angular displacement.

2. A flexible coupling for connecting aligned driving and driven shafts, comprising two complemental coupling members having peripherally spaced intermeshed engaged driving jaws, each coupling member comprising two sections each having a hub provided with a shaft recess, a radially outstanding flange at one end of said hub, and a driving jaw which projects axially from said flange at one side thereof, means clamping said sections together with said shaft recesses, flanges and jaws in opposed relation, said jaws having circular grooves in their inner faces, and means connecting said coupling members together against axial and lateral displacement while permitting angular displacement thereof comprising a disc radially and axially loosely received and retained in said grooves.

3. A flexible coupling for connecting aligned driving and driven shafts comprising two complemental coupling members connected with separate shafts and having intermeshed engaged driving jaws, said jaws having radially aligned circular grooves in their inner faces, and a circular connecting member retained in said aligned grooves.

4. A flexible coupling for connecting aligned driving and driven shafts comprising two complemental coupling members connected with separate shafts and having intermeshed engaged driving jaws, said jaws having radially aligned circular grooves in their inner faces, and a circular connecting member retained in said aligned grooves, said connecting member being free for restricted movement axially in said grooves, whereby to permit angular displacements of said coupling members.

5. A flexible coupling for connecting aligned driving and driven shafts comprising two complemental coupling members connected with separate shafts and having intermeshed engaged driving jaws, the jaws of each coupling member being diametrically opposed, said jaws having aligned circular grooves in their diametrically opposed inner faces, and a coupling-connecting disc located in all of said grooves and which retains said coupling member against axial displacement, said disc being axially loose in said grooves, whereby to permit angular displacements of said coupling members.

6. A flexible coupling for connecting aligned driving and driven shafts comprising two complemental coupling members connected with separate shafts and having intermeshed engaged driving jaws, the jaws of each coupling member being diametrically opposed, said jaws having aligned circular grooves in their diametrically opposed inner faces, and a coupling-connecting disc located in all of said grooves and which retains said coupling member against axial displacement and in axial alignment.

7. A flexible coupling comprising two complemental coupling members adapted to connect axially-aligned driving and driven shafts, said members having intermeshed engaged driving jaws, and a loose floating member rotatably located within the space bounded by the jaws of both coupling members and having interlocking connections therewith such that the coupling members are held against displacement both in an axial direction and also laterally thereof, the connection being loose so that the coupling members are free for relative angular displacement.

8. A flexible coupling for connecting the confronting ends of driving and driven shafts comprising two complemental coupling members having intermeshed driving jaws and each member having shaft engaging means and jaws that are located on opposite sides of the shaft, and a free floating member located within and rotatable on all of said jaws between the confronting ends of the shafts and having loosely interlocking connections therewith that hold said coupling members against separation while permitting relative angular displacement thereof.

CHESTER F. HATHAWAY.